(12) United States Patent
Ota et al.

(10) Patent No.: US 7,987,713 B2
(45) Date of Patent: Aug. 2, 2011

(54) ANGULAR VELOCITY SENSOR WITH MOUNTING PORTION AND COVER

(75) Inventors: Kazuhiro Ota, Yokohama (JP); Masanori Yachi, Yokohama (JP)

(73) Assignee: Tamagawa Seiki Co., Ltd., Nagano Prefecture (JP)

( * ) Notice: Subject to any disclaimer, the term of this patent is extended or adjusted under 35 U.S.C. 154(b) by 647 days.

(21) Appl. No.: 12/078,878

(22) Filed: Apr. 7, 2008

(65) Prior Publication Data

US 2008/0257043 A1    Oct. 23, 2008

(30) Foreign Application Priority Data

Apr. 5, 2007  (JP) .................................. 2007-099923

(51) Int. Cl.
    *G01P 1/02*    (2006.01)
(52) U.S. Cl. .......................................... 73/493; 73/431
(58) Field of Classification Search ................ 73/493, 73/431, 504.12, 504.14, 504.15, 504.16, 73/504.04

See application file for complete search history.

(56) References Cited

U.S. PATENT DOCUMENTS

| | | | | |
|---|---|---|---|---|
| 5,233,873 A * | 8/1993 | Mozgowiec et al. | ........... | 73/497 |
| 5,554,806 A * | 9/1996 | Mizuno et al. | ................... | 73/493 |
| 5,581,032 A * | 12/1996 | Uemura et al. | ................... | 73/493 |
| 5,668,316 A * | 9/1997 | Iwai et al. | ........................ | 73/493 |
| 5,783,748 A * | 7/1998 | Otani | .............................. | 73/493 |
| 5,942,685 A * | 8/1999 | Tabota | ............................ | 73/493 |
| 6,199,429 B1 * | 3/2001 | Hirosawa | ................... | 73/504.15 |
| 6,748,807 B2 * | 6/2004 | Yoshiuchi et al. | .............. | 73/493 |
| 6,880,399 B1 * | 4/2005 | Okoshi et al. | ................... | 73/493 |
| 7,127,945 B2 * | 10/2006 | Ookoshi | ......................... | 73/493 |
| 7,234,352 B2 * | 6/2007 | Mitani | ......................... | 73/504.16 |
| 2005/0248927 A1 | 11/2005 | Mashimo et al. | | |

FOREIGN PATENT DOCUMENTS

| | | |
|---|---|---|
| JP | 58-63771 U | 4/1983 |
| JP | 2003-28647 A | 1/2003 |
| JP | 2003-224163 A | 8/2003 |
| JP | 2005-322752 | 11/2005 |
| JP | 3807404 B2 | 5/2006 |

\* cited by examiner

*Primary Examiner* — Helen C. Kwok
(74) *Attorney, Agent, or Firm* — Arent Fox LLP (57) ABSTRACT

An angular velocity sensor includes: a package housing a vibrator to sense an angular velocity; a mounting portion mounting the package, the mounting portion having a first terminal for making a connection with the package; a second terminal for making an external connection, and a resin portion covering the first and second terminals so that a part of the first terminal and a part of the second terminal are exposed; and a cover having a joint portion made of a metal and covering the package, the cover being fixed to the mounting portion by joining the joint portion to a joint terminal made of a metal and provided to the mounting portion.

9 Claims, 8 Drawing Sheets

ANGULAR VELOCITY SENSOR WITH MOUNTING PORTION AND COVER

BACKGROUND OF THE INVENTION

1. Field of the Invention

The present invention generally relates to an angular velocity sensor, and more particularly, to an angular velocity sensor in which a package for housing a vibrator is mounted on a mounting portion and is covered with a cover.

2. Description of the Related Art

An angular velocity sensor is a sensor that senses an angular velocity in rotation, and is used in systems for image stabilization of cameras, for automotive navigation, for stability control of vehicles or postures of robots, and the likes. FIG. 9 of Japanese Patent Application Publication No. 2003-28647 (hereinafter referred to as Document 1) discloses a technique in which a mounting portion (a base portion 55a) and a cover (a cover portion 55b) of a pin-mounting-type angular velocity sensor are made of a metal.

The angular velocity sensor has a vibrator, and a vibrating mode thereof senses an angular velocity. An impact conveyed to the vibrator may cause the angular velocity sensor to malfunction. In order to reduce unnecessary vibration externally applied, the vibrator is housed in a package. A certain application may require the sensing axis of the angular velocity to be almost perpendicular to a surface on which the angular velocity sensor is mounted. When the sensing axis of the angular velocity is in a side direction of a package, as shown in FIG. 1 of Japanese Patent No. 3807404 (hereinafter referred to as Document 2), a side surface of the package (a case 30) is fixed to a resin mounting portion (a mounting portion) so that the sensing axis of the angular velocity is in a direction vertical to the mounting portion (a mounting surface of the angular velocity sensor). Thus, the package is arranged vertically. Further, the package is covered with a cover 59 for protection purpose.

Recently, there has been an increasing demand to mount an angular velocity sensor on a surface of a mounting substrate so as to reduce the density of mounting. When the mounting portion (the base portion 55a) is made of a metal as described in Document 1, a terminal for surface mounting should be used together with an insulating portion in order to insulate the terminal for surface mounting from the mounting portion. The insulating portion increases the fabricating cost and the height of the angular velocity sensor. Another isolation is needed when the mounting portion made of a metal as described in Document 1 is applied to the arrangement described in Document 2 in which the vibrator is housed in the package in order to reduce unnecessary vibration, and the sensing axis of angular velocity is almost perpendicular to the surface on which the angular velocity sensor is mounted. More specifically, the above isolation mutually insulates interconnections for connecting terminals of the package (a case terminal 37 in FIG. 7 of Document 1) and terminals provided on the mounting portion and used for making external connections (terminals 45 through 49 in FIG. 12 of Document 1). The above insulation increases the fabricating cost.

The mounting portion formed with resin disclosed in Document 2 reduces the fabricating cost, as compared to that formed with metal and used together with the insulating portion. Besides, it is possible to use resin and easily insulate the interconnections for connecting the terminals of the package (the case terminal 37) and the terminals provided on the mounting portion (the terminal 45 through 49) and used for making external connections. However, an engaging portion 60 of the cover is folded down on a dent portion 58 of the mounting portion in order to fix the cover to the mounting portion as in FIG. 3 of Document 2. It is preferable to fix the cover to the both sides of the mounting portion. This fixing causes the engaging portions 60 to be folded in different directions, and needs an increased number of fabricating steps. Further, the mounting portion made of resin may be damaged by impact at the time of folding the engaging portion 60. The mounting portion is required to be thick in order to restrain the damage. The dent portion 58 should be formed so as to realize the leveled bottom of the mounting portion. The above requirements complicate the fabricating process and increase the fabricating cost.

As described above, in the angular velocity sensor, there is a demand for inexpensively fixing the cover to the mounting portion made of resin having the terminals for making connections with the package and those for making external connections. Particularly, as in the case described in Document 2, the cover is made of a metal for shielding, while the mounting portion is mainly made of resin. Thus, the process of fixing the cover to the mounting portion is complicated.

SUMMARY OF THE INVENTION

The present invention has been made in view of the above-mentioned circumstances and provides an angular velocity sensor that has a simplified fabricating process for fixing a cover to a mounting portion made of resin, and consequently the fabricating cost thereof is reduced.

According to an aspect of the present invention, there is provided an angular velocity sensor including: a package housing a vibrator to sense an angular velocity; a mounting portion mounting the package, the mounting portion having a first terminal for making a connection with the package; a second terminal for making an external connection, and a resin portion covering the first and second terminals so that a part of the first terminal and a part of the second terminal are exposed; and a cover having a joint portion made of a metal and covering the package, the cover being fixed to the mounting portion by joining the joint portion to a joint terminal made of a metal and provided to the mounting portion.

Another aspect of the present invention, there is provided an angular velocity sensor including: a package housing a vibrator to sense an angular velocity; a mounting portion mounting the package, the mounting portion having a first terminal for making a connection with the package; a second terminal for making an external connection, and a resin portion covering the first and second terminals so that a part of the first terminal and a part of the second terminal are exposed; and a cover that covers the package and is fixed to the mounting portion by remelting a part of resin of the mounting portion.

DESCRIPTION OF THE PREFERRED EMBODIMENTS

A description will now be given of embodiments of the present invention with reference to the accompanying drawings.

Figure 1:
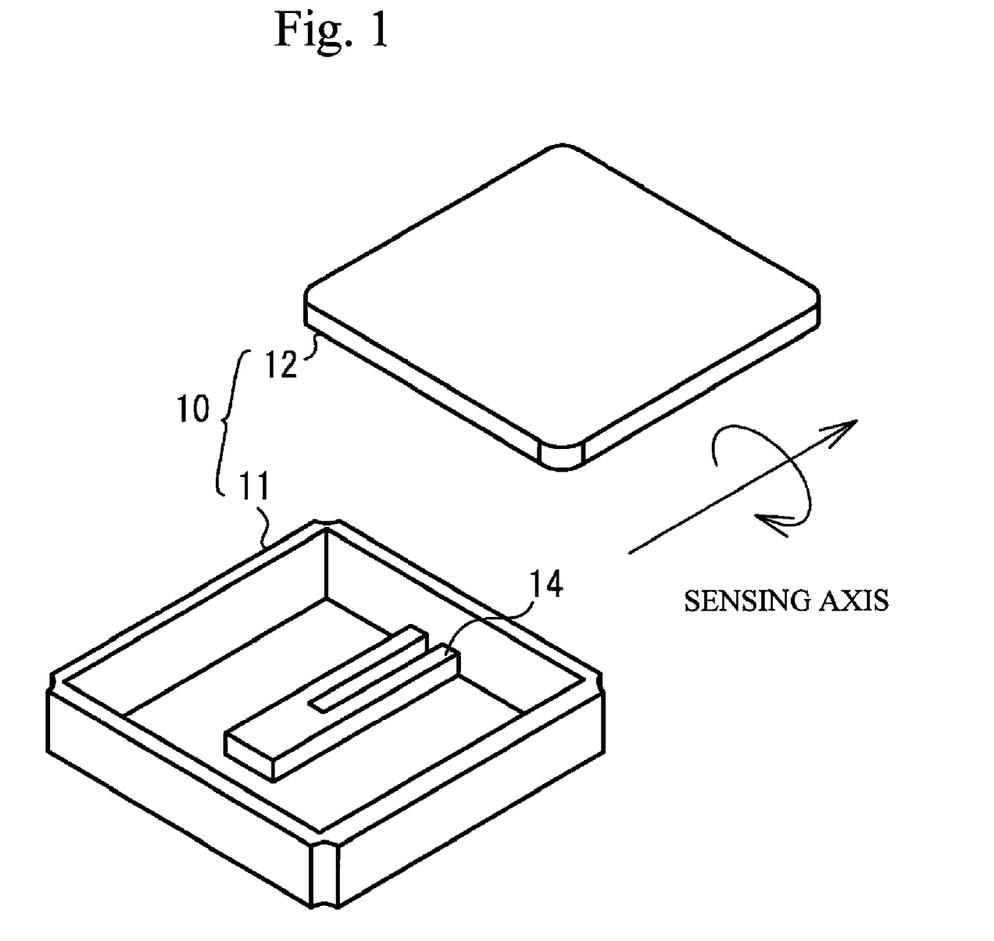
FIG. 1 is a perspective view of a package housing a vibrator from which a cap portion is removed.

FIG. 1 is a perspective view of a package 10 of an angular velocity sensor in accordance with a first embodiment. Referring to FIG. 1, a tuning-fork vibrator 14 sensing an angular velocity is housed in a cavity of a main body 11 of the package 10 made of ceramic. The tuning-fork vibrator 14 is electrically connected to pad electrodes (not shown) on the backside of the main body 11, and is mounted on the main body 11 via a vibration-proofing portion (not shown) for restraining the tuning-fork vibrator 14 from being affected by unnecessary vibration applied to the package 10. The sensing axis of the angular velocity is in the arm direction of the tuning-fork vibrator 14, and it is possible to sense the angular velocity about the sensing axis. A cap portion 12 made of Kovar (nickel-cobalt ferrous alloy) is attached to the main body 11 so as to house the tuning-fork vibrator 14 in the package 10.

Figure 2A:
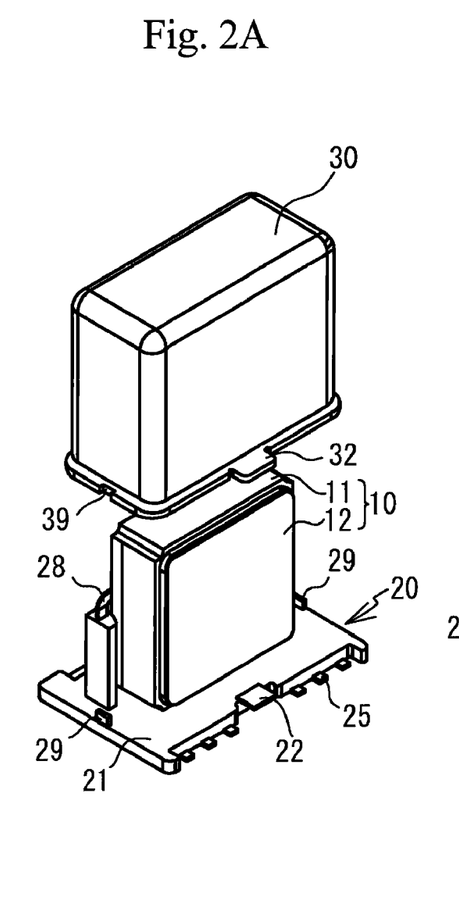
FIGS. 2A and 2B are perspective views of an angular velocity sensor in accordance with a first embodiment in which a cover is removed from the angular velocity sensor.
Figure 2B:
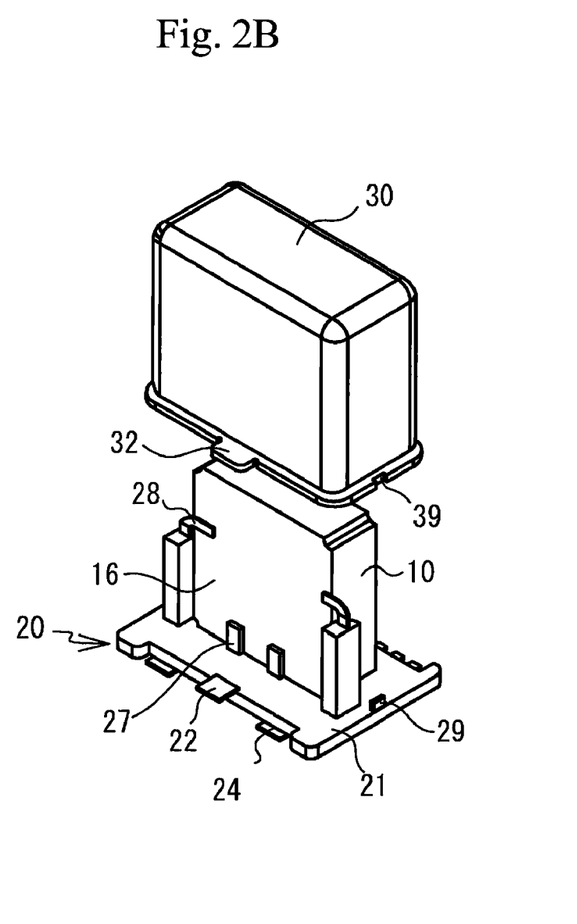

FIGS. 2A and 2B are perspective views of the angular velocity sensor in which a cover 30 made of a metal such as SPCC (steel) is removed from a mounting portion 20. The mounting portion 20 has first terminals 27 and 28, second terminals 24 and 25, joint terminals 22, a wiring (not shown) and a resin portion 21. The first terminals 27 and 28 are electrically connected to pad electrodes (not shown) provided on the backside of the package 10 (that is, a side surface 16 in FIG. 2B) by solder. The direction of the axis about which the angular velocity is sensed is in an upward direction of the package 10 (that is, a direction almost perpendicular to a mounting surface of a mounting substrate on which the mounting portion 20 is mounted). The second terminals 24 and 25 are used to make external connections. The joint terminals 22 are connected to joint portions 32 of the cover 30, which is made of a metal. The cover 30 has engaging portions 39 each formed in a groove shape, and the resin portion 21 has engaging portions 29 each formed in a protrusion shape.

Figure 3:
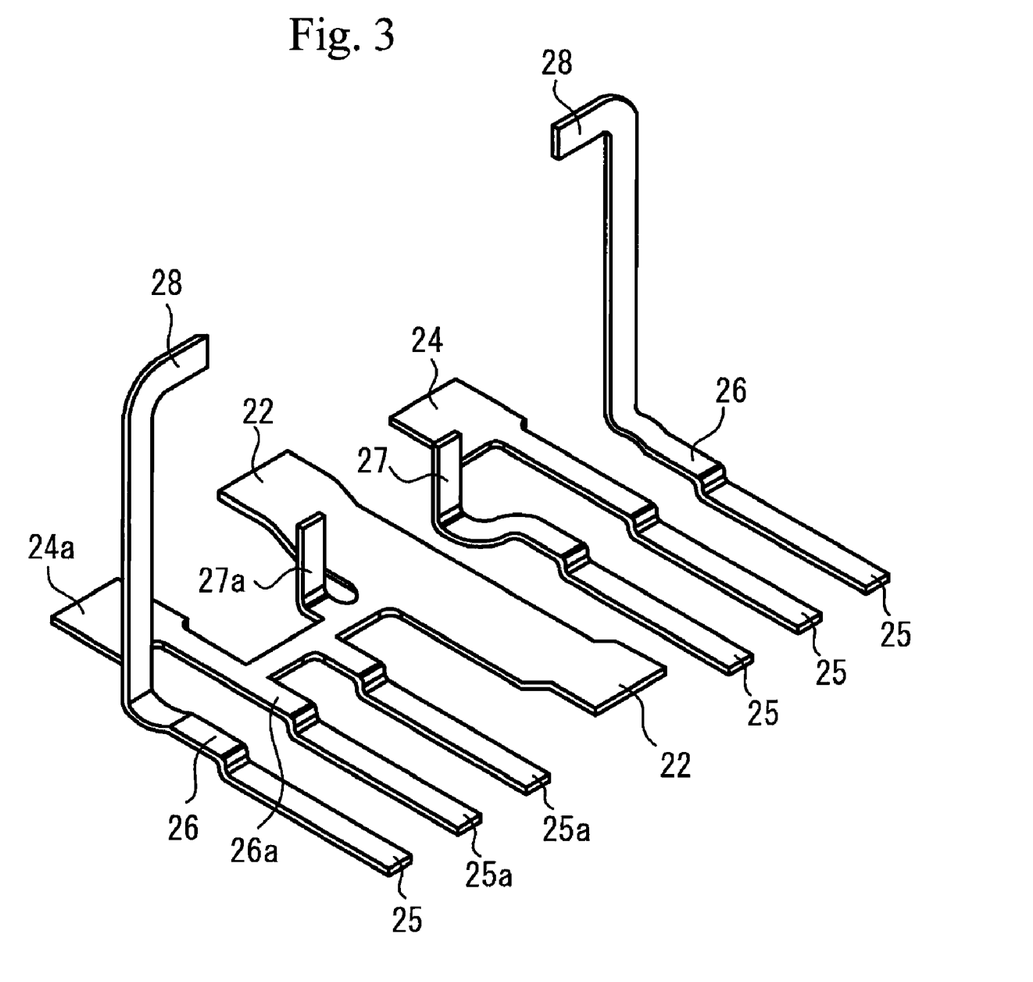
FIG. 3 is a perspective view of terminals and interconnections of the angular velocity sensor.

FIG. 3 schematically shows the first terminals 27 and 28, the second terminals 24 and 25, the joint terminals 22 and an interconnection 26, which are formed with a metal in which Cu (copper) is plated with Au (gold). The first and second terminals 27, 28 and 24, 25 are connected to the wiring 26. It can be seen from comparison between FIGS. 2A and 2B and FIG. 3 that the resin portion 21 of the mounting portion 20 is provided to cover the interconnections 26 entirely, and expose at least a part of the first and second terminals 27, 28 and 24, 25. The joint terminals 22 are electrically connected to a specific first terminal 27a among the first terminals 27, and specific second terminals 24a and 25a among the second terminals 24 and 25. The second terminals 24 and 25 are exposed from the bottom side of the resin portion 21 (that is, the mounting surface of the mounting substrate on which the mounting portion 20 is mounted). In other words, the second terminals 24 and 25 are arranged so that the mounting portion 20 can be surface-mounted.

Figure 4A:
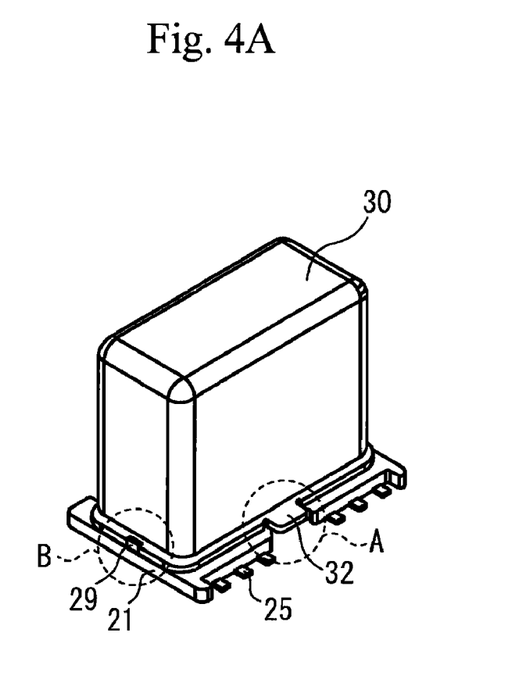
FIGS. 4A and 4B are perspective views of the angular velocity sensor in accordance with the first embodiment in which the cover is attached.
Figure 4B:
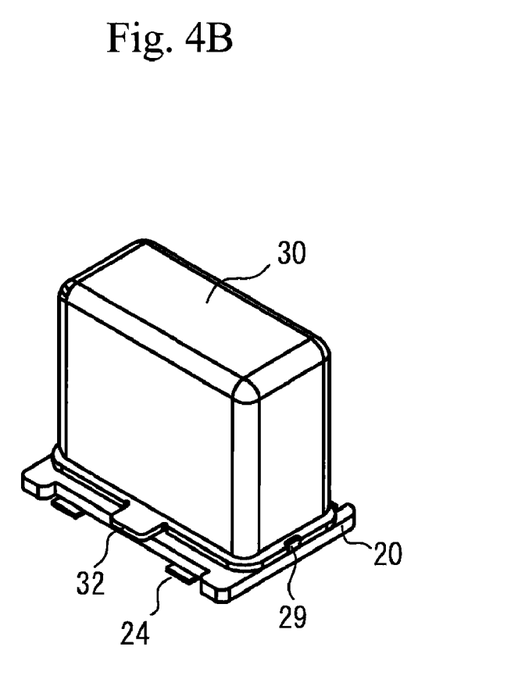
Figure 5:
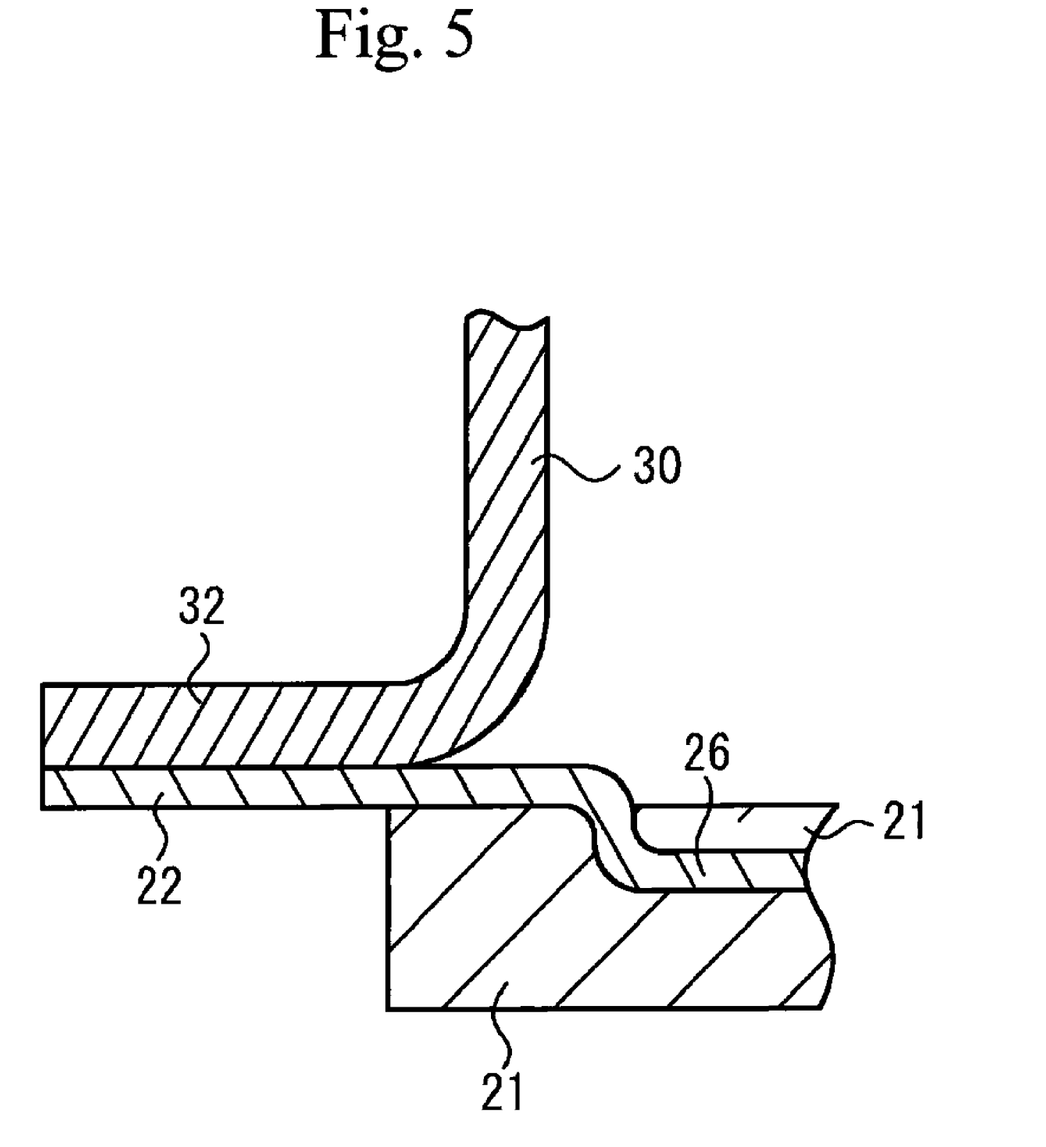
FIG. 5 is a cross-sectional view of a connecting area as specified by an area A circled with a broken line in FIG. 4A.
Figure 6A:
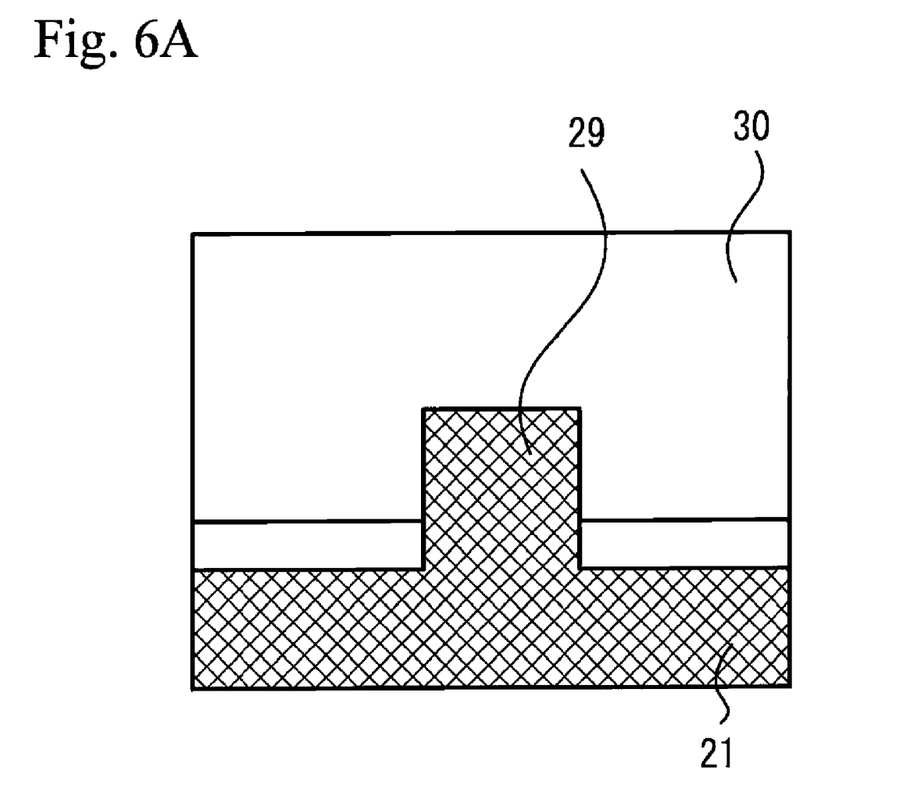
FIG. 6A is an enlarged side view of an area B circled with a broken line in FIG. 4A.
Figure 6B:
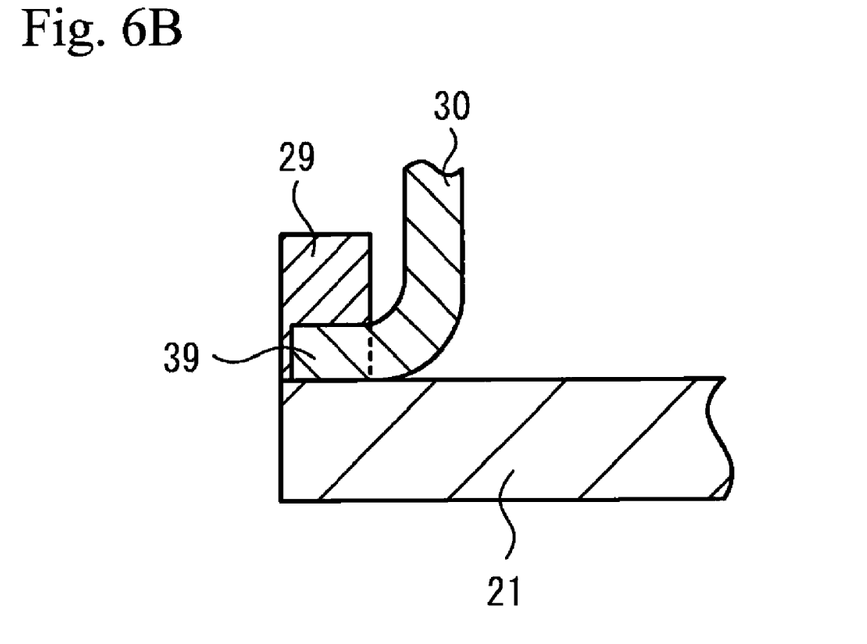
FIG. 6B is a cross-sectional view thereof.

FIGS. 4A and 4B schematically show the angular velocity sensor in which the cover 30 is fixed to the mounting portion 20. FIG. 5 is a cross-sectional view of an area A circled with a broken line in FIG. 4A. The joint portions 22 of the mounting portion 20 and the joint portions 32 of the cover 30 are welded by laser. Thus, the cover 30 is fixed to the mounting portion 20. FIG. 6A is an enlarged view of an area B circled with a broken line in FIG. 4A, and FIG. 6B is a cross-sectional view thereof. The resin portion 21 has a protrusion as the engaging portion 29, and the cover 30 has a groove as the engaging portion 39. The engaging portion 29 fits into the engaging portion 39 so as to place the cover 30 against the mounting portion 20 in position.

Figure 7:
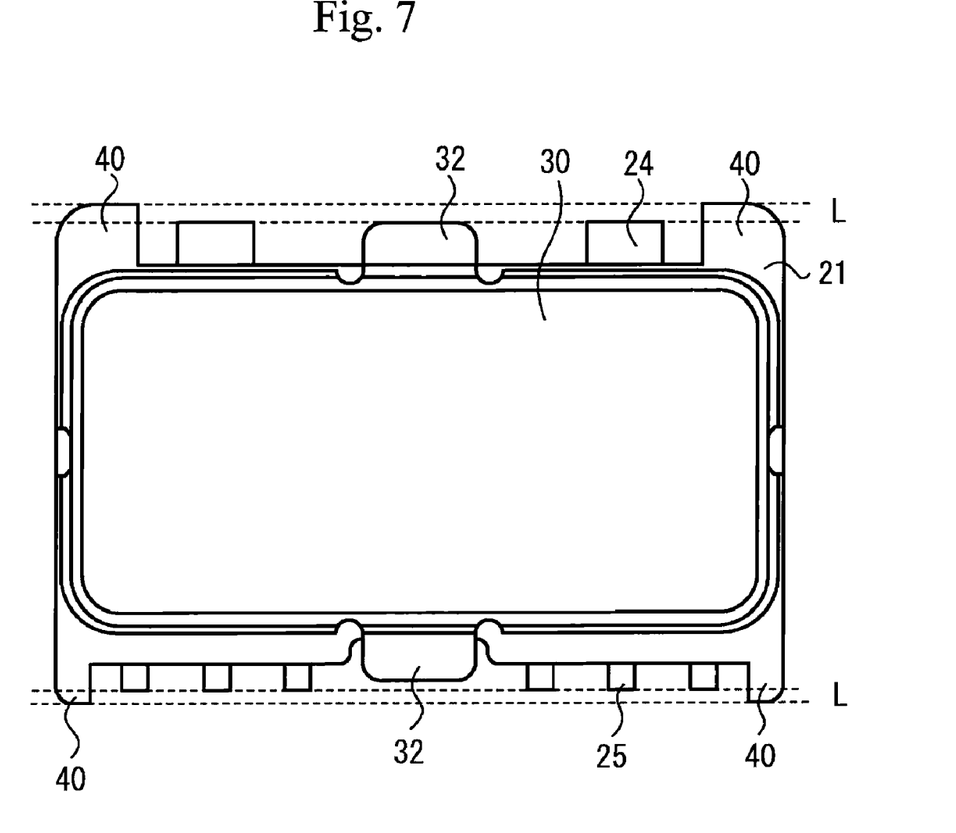
FIG. 7 is a top view of the angular velocity sensor in accordance with the first embodiment.

FIG. 7 is a top view from the top of the angular velocity sensor in accordance with the first embodiment. Tips of the second terminals 24 and 25 are arranged outside of main side surfaces of the resin portion 21. The main side surfaces denote those of the resin portion 21 excluding protecting portions 40 on which the second terminals 24 and 25 are provided. It is thus possible to confirm the tips of the second terminals 24 and 25 from the top of the angular velocity sensor. Therefore, it is easy to confirm whether the second terminals 24 and 25 are soldered when the angular velocity sensor is mounted on the circuit substrate. The resin portion 21 of the mounting portion 20 has the protecting portions 40 on the respective corners, and the side surfaces thereof are arranged outside of the second terminals 24 and 25. That is, the second terminals 24 and 25 are a distance L further in than lines connecting outermost edges of the protecting portions 40 on the main side surfaces in the longitudinal direction. It is thus possible to prevent the second terminals 24 and 25 from being deformed or damaged when the angular velocity sensor is grasped. For example, when the angular velocity sensor is removed from a carrier tape, the above structure can prevent the second terminals 24 and 25 from being deformed or damaged by getting caught with the carrier tape.

In accordance with the first embodiment, the joint portions 32 of the cover 30 made of a metal are welded to the joint terminals 22 made of a metal provided on the mounting portion 20. The joint portions 32 and the joint terminals 22 are both made of a metal and are capable of being welded easily. Thus, the fabricating process does not need the process of bending the fixing portion as shown in Document 2, and can be simplified. Further, it is possible to avoid any damage on the mounting portion 20 due to impact applied thereto at the time of bending the fixing portion, and to thin the resin portion 21 of the mounting portion 20. And the joint terminals 22 can be formed with the first and second terminals 27, 28 and 24, 25 at the same time, the fabricating process can be further simplified. The above can reduce the fabricating cost of the angular velocity sensor.

The present invention is not limited to welding of the joint portions 32 to the joint terminals 22 but may use a metal such as solder or an insulating adhesive to connect the joint portion 32 and the joint terminals 22. Both the joint portions 32 and the joint terminals 22 are made of a metal, and may be joined by a process other than welding. Preferably, multiple joint portions 32 and multiple joint terminals 22 may be provided so as to secure the joining strength of the mounting portion 20 and the cover 30.

It is preferable that the cover 30 is made of an electrically conductive material, and the joint terminals 22 are electrically connected to the first terminal 27a or the second terminal 25a for making a connection with the package 10. It is thus possible to set the cover 30 at a particular potential, which may be a ground potential. Therefore, the shield effect by the cover 30 can be enhanced.

Preferably, the engaging portions 29 and 39 for positioning may be provided on the mounting portion 20 and the cover 30 respectively. The mounting portion 20 and the cover 30 can be easily positioned in joining. The shapes of the engaging portions 29 and 39 are not limited to the aforementioned ones, but may fit each other.

Figure 8A:
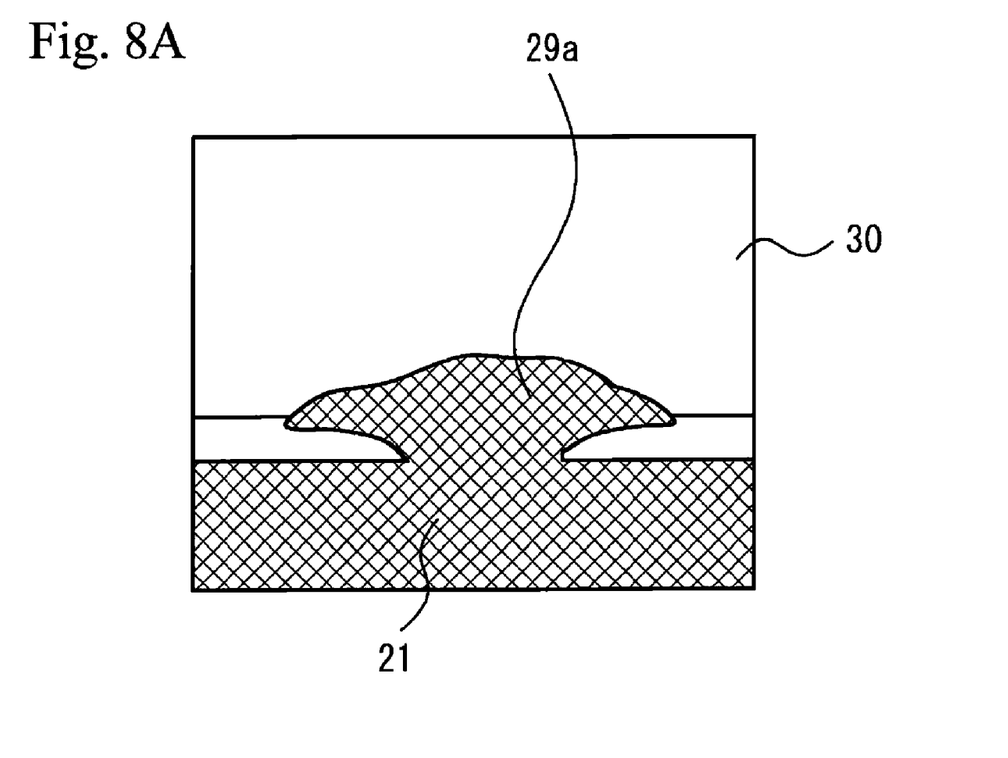
FIGS. 8A and 8B schematically show another method for fixing the cover to the mounting portion.
Figure 8B:
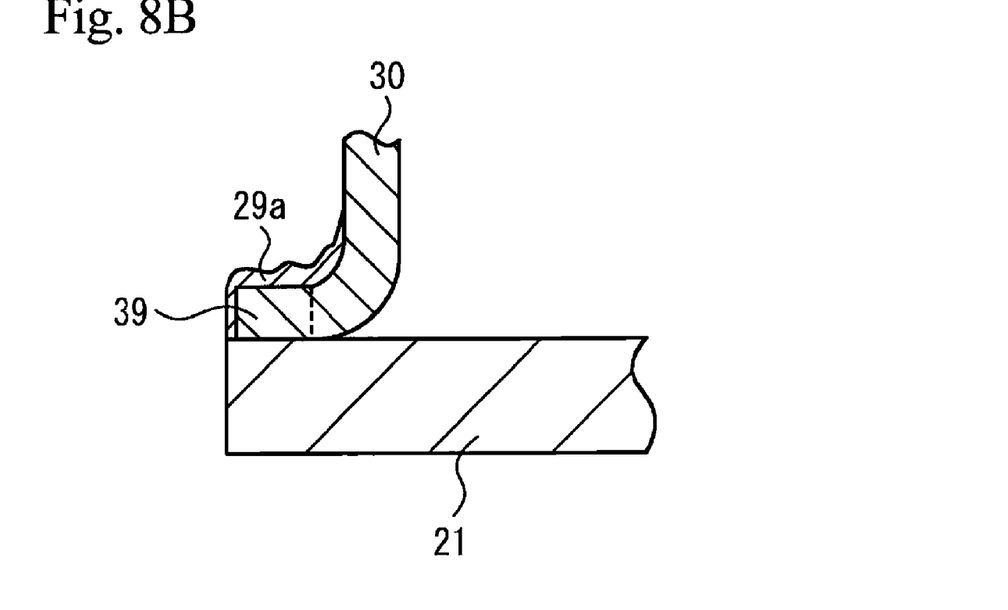

FIGS. 8A and 8B show another method for fixing the cover 30 to the mounting portion 20. The engaging portion 29 shown in FIGS. 6A and 6B is remelted so as to fix the cover 30. That is, the protrusion of the mounting portion 20 is remelted with the protrusion being fitted into a groove of the cover 30, so that the cover 30 can be fixed to the mounting portion 20 with ease. In this way, the cover 30 can easily be fixed to the mounting portion 20 by remelting a part of the resin of the mounting portion 20. The resin for remelting may be the same as or different from that of the resin portion 21.

The fixing by remelting the resin portion 21 to fix the cover may be used along with joining. Thus, the cover 30 can be fixed to the mounting portion 20 more firmly. The cover 30 may be fixed alone by remelting of the resin portion 21, so that the fabricating cost can be reduced. It is preferable to melt the resin portion 21 without using reflow of the solder at the time of mounting the angular velocity sensor on the circuit substrate. Further, it is preferable to remelt the resin portion 21 at a higher temperature than the reflow temperature of solder. The above may be satisfied with a material such as liquid crystal polymer.

In accordance with the first embodiment and the variations thereof, the cover 30 is not limited to metal. The mounting portion 20 is mainly composed of the resin portion 21 when the second terminal is the terminal for surface mounting, so that the fabricating cost can be reduced. Further, when the cover 30 is made of a metal, it is required that the cover 30 made of a metal is fixed to the resin portion 21 of the mounting portion 20. Consequently, the present invention is efficiently applied to the case that the cover 30 is made of a metal and the second terminal is of surface mounting type.

The present invention is not limited to the specifically disclosed embodiments, but other embodiments and variations may be made without departing from the scope of the present invention.

The present application is based on Japanese Patent Application No. 2007-099923 filed Apr. 5, 2007, the entire disclosure of which is hereby incorporated by reference.

What is claimed is:

1. An angular velocity sensor comprising:
a package housing a vibrator to sense an angular velocity;
a mounting portion mounting the package, the mounting portion having a first terminal for making a connection with the package;
a second terminal for making an external connection, and a resin portion covering the first and second terminals so that a part of the first terminal and a part of the second terminal are exposed; and
a cover having a joint portion made of a metal and covering the package, the cover being fixed to the mounting portion by joining the joint portion to a joint terminal made of a metal and provided to the mounting portion,
wherein the joint terminal and the joint portion extend from the resin portion in a direction in which a surface of the mounting portion expands, and the package is mounted on the surface of the mounting portion.

2. The angular velocity sensor as claimed in claim 1, wherein the joint portion is joined to the joint terminal by welding.

3. The angular velocity sensor as claimed in claim 1, wherein a plurality of joint terminals are provided.

4. The angular velocity sensor as claimed in claim 1, wherein the cover is made of an electrically conductive material, and the joint terminal is electrically connected to the first terminal.

5. The angular velocity sensor as claimed in claim 1, wherein the mounting portion and the cover have respective engaging portions for positioning.

6. The angular velocity sensor as claimed in claim 1, wherein the cover is fixed to the mounting portion by remelting a part of the resin of the mounting portion.

7. The angular velocity sensor as claimed in claim 6, wherein the cover is fixed to the mounting portion by remelting a protrusion of the mounting portion, which is fitted into a groove of the cover.

8. The angular velocity sensor as claimed in claim 1, wherein the mounting portion has a protecting portion having a side surface that is flush with or further out than the second terminal.

9. The angular velocity sensor as claimed in claim 1, wherein the cover is made of a metal and the second terminal is arranged so that the mounting portion can be surface-mounted.

* * * * *